(12) United States Patent
Takagi et al.

(10) Patent No.: US 11,645,299 B2
(45) Date of Patent: May 9, 2023

(54) DATA MANAGEMENT DEVICE AND DATA MANAGEMENT METHOD

(71) Applicant: HITACHI, LTD., Tokyo (JP)

(72) Inventors: Akira Takagi, Tokyo (JP); Motonobu Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 13 days.

(21) Appl. No.: 17/371,563

(22) Filed: Jul. 9, 2021

(65) Prior Publication Data
US 2022/0019597 A1 Jan. 20, 2022

(30) Foreign Application Priority Data
Jul. 15, 2020 (JP) .............................. JP2020-121542

(51) Int. Cl.
*G06F 16/25* (2019.01)
*G06F 16/2455* (2019.01)
*G06F 16/22* (2019.01)
*G06F 16/28* (2019.01)

(52) U.S. Cl.
CPC .......... *G06F 16/258* (2019.01); *G06F 16/221* (2019.01); *G06F 16/2282* (2019.01); *G06F 16/24553* (2019.01); *G06F 16/287* (2019.01)

(58) Field of Classification Search
CPC .. G06F 16/258; G06F 16/221; G06F 16/2282; G06F 16/24553; G06F 16/287
See application file for complete search history.

(56) References Cited

U.S. PATENT DOCUMENTS

| 9,152,690 B2 * | 10/2015 | Xue ...................... G06F 16/284 |
| 2016/0188710 A1 * | 6/2016 | Dulba Naik .......... G06F 16/214 707/792 |
| 2017/0083571 A1 * | 3/2017 | Shankar ................ G06F 16/282 |
| 2019/0340291 A1 * | 11/2019 | Raman ................ H04L 41/5009 |
| 2020/0250190 A1 * | 8/2020 | Yang ...................... G06F 16/258 |

FOREIGN PATENT DOCUMENTS

JP    2010-224824 A    10/2010

* cited by examiner

*Primary Examiner* — Dangelino N Gortayo
(74) *Attorney, Agent, or Firm* — Volpe Koenig

(57) ABSTRACT

A data management device is communicably connected to a first database and a second database in a different structure from the first database. The second database is converted to the structure of the first database, and is stored as a conversion table based on first data schema information defining the structure of the first database and second data schema information defining the structure of the second database. For which database a query that is received from the outside and described corresponding to the structure of the first database is a query is determined with reference to the conversion table. When the query is determined to be a query for the second database, the query is converted and is introduced into the second database, and a query result in response to the query is converted into a format corresponding to the structure of the first database and output.

8 Claims, 10 Drawing Sheets

FIG. 5
ANALYSIS SETTING TABLE 211

| EMPLOYEE MASTER | |
|---|---|
| DATA DELIMITER | PERIOD |
| COLUMN NAME | EMPLOYEE ID.SURNAME.FIRST NAME.EMPLOYEE NUMBER.DEPARTMENT ID |
| ... | ... |
| FACTORY EQUIPMENT DB | |
| DATA DELIMITER | PERIOD |
| IDENTIFIER | FACTORY NAME.EQUIPMENT NAME.PHYSICAL QUANTITY |
| ... | ... |
| PROCESS DATABASE | |
| DATA DELIMITER | SLASH |
| IDENTIFIER | Vertex/Edge |

FIG. 6
EMPLOYEE MASTER 20-1
(EXAMPLE OF RELATIONAL DATABASE)

| EMPLOYEE ID | SURNAME | FIRST NAME | EMPLOYEE NUMBER | DEPARTMENT ID |
|---|---|---|---|---|
| 1 | XXX | YYY | 202001 | 4 |
| 2 | SSS | TTT | 202002 | 5 |
| 3 | PPP | QQQ | 202003 | 6 |
| 4 | JJJ | KKK | 202004 | 4 |
| 5 | AAA | BBB | 202005 | 5 |
| 6 | CCC | DDD | 202006 | 6 |
| ⋮ | ⋮ | ⋮ | ⋮ | ⋮ |

FACTORY EQUIPMENT MONITOR DATABASE 20-2
(EXAMPLE OF KEY VALUE DATABASE)

| KEY | VALUE |
| --- | --- |
| FACTORY A.101 EQUIPMENT.PRESSURE | 10 |
| FACTORY A.101 EQUIPMENT.FLOW RATE | 100 |
| FACTORY A.102 EQUIPMENT.PRESSURE | 12 |
| FACTORY A.102 EQUIPMENT.FLOW RATE | 98 |
| FACTORY B.201 EQUIPMENT.PRESSURE | 8 |
| FACTORY B.201 EQUIPMENT.FLOW RATE | 103 |
| FACTORY B.202 EQUIPMENT.PRESSURE | 13 |
| FACTORY B.202 EQUIPMENT.FLOW RATE | 102 |

PROCESS DATABASE 20-3
(GRAPH DATABASE EXAMPLE)

CONVERSION TABLE GENERATION PROCESS FLOW EXAMPLE

FIG. 10

CONFIGURATION EXAMPLE OF DATA NAME AND LOCATION CORRESPONDENCE INTERMEDIATE TABLE — 204A

| DATA NAME | DATABSE MODEL | DEVICE NAME | DATABASE NAME | IDENTIFIER 1 | IDENTIFIER 2 | IDENTIFIER 3 | COLUMN NAME |
|---|---|---|---|---|---|---|---|
| DEVICE A.DB_1.EMPLOYEE MASTER | RELATIONAL | DEVICE A | DB_1 | EMPLOYEE MASTER | | | SURNAME, FIRST NAME, EMPLOYEE NUMBNER, ... |
| DEVICE A.DB_1.DEVICE MASTER | RELATIONAL | DEVICE A | DB_1 | DEVICE MASTER | | | DEVICE NAME, INSTALLATION LOCATION, ... |
| DEVICE A.DB_1.TOOL MASTER | RELATIONAL | DEVICE A | DB_1 | TOOL MASTER | | | TOOL NAME, INSTALLATION LOCATION, ... |
| DEVICE B.DB_2.FACTORY A. EQUIPMENT 101.PRESSURE | KEY VALUE | DEVICE B | DB_2 | FACTORY A | EQUIPEMENT 101 | PRESSURE | — |
| DEVICE B.DB_2.FACTORY A. EQUIPMENT 101.FLOW RATE | KEY VALUE | DEVICE B | DB_2 | FACTORY A | EQUIPEMENT 101 | FLOW RATE | — |
| DEVICE B.DB_2.FACTORY A. EQUIPMENT 102.PRESSURE | KEY VALUE | DEVICE B | DB_2 | FACTORY A | EQUIPEMENT 102 | PRESSURE | — |
| DEVICE B.DB_2.FACTORY A. EQUIPMENT 102.FLOW RATE | KEY VALUE | DEVICE B | DB_2 | FACTORY A | EQUIPEMENT 102 | FLOW RATE | — |
| DEVICE B.DB_2.FACTORY B. EQUIPMENT 201.PRESSURE | KEY VALUE | DEVICE B | DB_2 | FACTORY B | EQUIPEMENT 201 | PRESSURE | — |
| DEVICE B.DB_2.FACTORY B. EQUIPMENT 201.FLOW RATE | KEY VALUE | DEVICE B | DB_2 | FACTORY B | EQUIPEMENT 201 | FLOW RATE | — |
| DEVICE B.DB_2.FACTORY B. EQUIPMENT 202.PRESSURE | KEY VALUE | DEVICE B | DB_2 | FACTORY B | EQUIPEMENT 202 | PRESSURE | — |
| DEVICE B.DB_2.FACTORY B. EQUIPMENT 202.FLOW RATE | KEY VALUE | DEVICE B | DB_2 | FACTORY B | EQUIPEMENT 202 | FLOW RATE | — |
| DEVICE C.DB_3.Vertex.PROCESS | GRAPH | DEVICE C | DB_3 | Vertex | PROCESS | | PROCESS NAME, PROCESS RELATIONSHIP |
| DEVICE C.DB_3.Edge.PRE-PROCESS | GRAPH | DEVICE C | DB_3 | Edge | PROCESS RELATIONSHIP | | STARTING PROCESS, NEXT PROCESS |

FIG. 11

CONFIGURATION EXAMPLE OF DATA NAME AND LOCATION CORRESPONDENCE TABLE 204

| DATA NAME | DATABASE MODEL | DEVICE NAME | DATABASE NAME | IDENTIFIER 1 | IDENTIFIER 2 | IDENTIFIER 3 | COLUMN NAME |
|---|---|---|---|---|---|---|---|
| ... | ... | ... | ... | ... | ... | ... | ... |
| EMPLOYEE MASTER | RELATIONAL | DEVICE A | DB_1 | EMPLOYEE MASTER | | | SURNAME, FIRST NAME, EMPLOYEE NUMBER, ... |
| DEVICE MASTER | RELATIONAL | DEVICE A | DB_1 | DEVICE MASTER | | | DEVICE NAME, INSTALLATION LOCATION, ... |
| TOOL MASTER | RELATIONAL | DEVICE A | DB_1 | TOOL MASTER | | | TOOL NAME, INSTALLATION LOCATION, ... |
| FACTORY A | KEY VALUE | DEVICE B | DB_2 | FACTORY A | | | REMAINING IDENTIFIER 1 (= EQUIPMENT), REMAINING IDENTIFIER 2(PHYSICAL QUANTITY), TIME, VALUE |
| FACTORY B | KEY VALUE | DEVICE B | DB_2 | FACTORY B | | | REMAINING IDENTIFIER 1 (= EQUIPMENT), REMAINING IDENTIFIER 2(PHYSICAL QUANTITY), TIME, VALUE |
| EQUIPMENT 101 | KEY VALUE | DEVICE B | DB_2 | FACTORY A | EQUIPMENT 101 | | REMAINING IDENTIFIER 1 (= PHYSICAL QUANTITY), TIME, VALUE |
| EQUIPMENT 102 | KEY VALUE | DEVICE B | DB_2 | FACTORY A | EQUIPMENT 102 | | REMAINING IDENTIFIER 1 (= PHYSICAL QUANTITY), TIME, VALUE |
| EQUIPMENT 201 | KEY VALUE | DEVICE B | DB_2 | FACTORY B | EQUIPMENT 201 | | REMAINING IDENTIFIER 1 (= PHYSICAL QUANTITY), TIME, VALUE |
| EQUIPMENT 202 | KEY VALUE | DEVICE B | DB_2 | FACTORY B | EQUIPMENT 202 | | REMAINING IDENTIFIER 1 (= PHYSICAL QUANTITY), TIME, VALUE |
| PROCESS | GRAPH | DEVICE C | DB_3 | Vertex | PROCESS | | PROCESS NAME, PROCESS RELATIONSHIP |
| PROCESS RELATIONSHIP | GRAPH | DEVICE C | DB_3 | Edge | PROCESS RELATIONSHIP | | STARTING PROCESS, NEXT PROCESS |

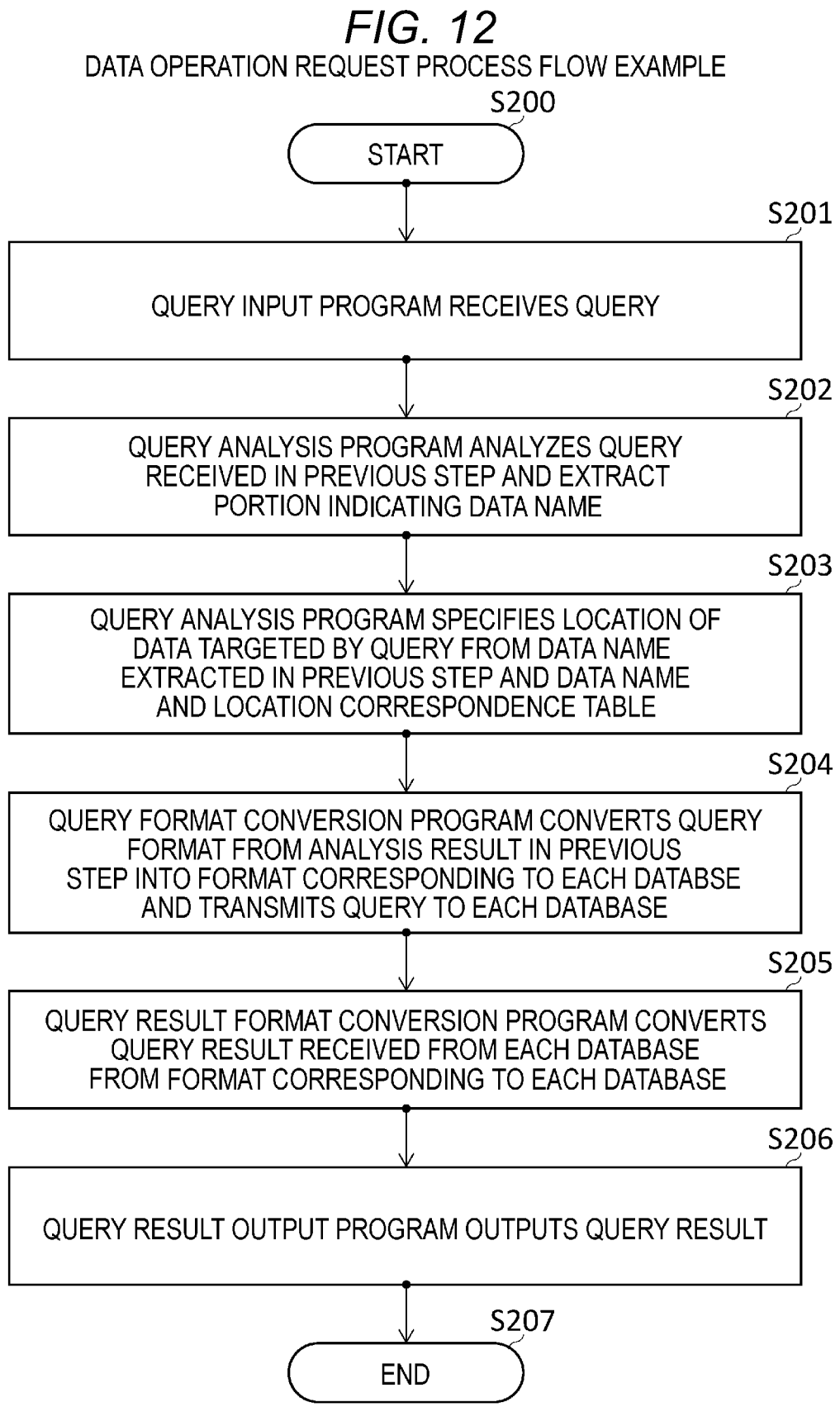

DATA MANAGEMENT DEVICE AND DATA MANAGEMENT METHOD

CROSS-REFERENCE TO RELATED APPLICATION

This application claims priority pursuant to Japanese patent application No. 2020-121542, filed on Jul. 15, 2020, the entire disclosure of which is incorporated herein by reference.

BACKGROUND

Technical Field

The present invention relates to a data management device and a data management method.

Related Art

In recent years, information processing systems are constructed in various aspects of society with the development of information and communication technology. In such an information processing system, various databases are provided in order to store a large amount of data to be target of information process and to use the data efficiently. The relational data model is often used as the database model. In the relational data model, the data is characterized by the relationships between the data recorded in the table format, or the like, and thus there is an advantage that the database operation may be performed by a unified database query language (for example, Structured Query Language, (SQL)). However, when the amount of data to be operated becomes large, there is a problem in that the time required for data operation becomes long, and the database utilization efficiency decreases.

Therefore, not only the relational data model but also various database models have come to be used according to the characteristics of data to be operated. Examples of these data models include a key value model and a graph model. By combining such different types of databases, an efficient database is constructed according to the characteristics of the data to be handled, and a multi-model database that enables integrated handling of these multiple databases is also developed.

However, in the case of a multi-model database, it is necessary to prepare a database management system individually for each different data model and also prepare a management system that enables the user to operate the database management system in an integrated manner, and thus there has been a problem in that the number of manhours for development becomes excessive. In addition, when a database system operated by using an existing database group is migrated to a new multi-model database, it is difficult to develop a system for integrated operation of these database groups in many cases.

Here, for example, in JP-A-2010-224824, as an object, a database accessed by a database operation language according to a relational data model is set to be configured with a database according to a relational data model and databases according to the other models. Then, in order to solve this problem, JP-A-2010-224824 suggests a configuration in which, "when the database operation request described by the SQL transmitted from an application group 17 is received, a database switching unit 21 sends, depending on the name of the relation operated by the operation request, the request to any one of a relational database operation unit 24 that manages a relational database 25 and a database operation conversion unit 26 that manages a non-relational database, for example, an indexed record data 28", and "the database operation conversion unit 26 converts the received request into an API that operates the indexed record data 28 with reference to a conversion table 27" (Abstract).

In the technology disclosed in JP-A-2010-224824, a program for converting a database operation request described in a database operation language of the relational database into a database operation request for a non-relational database model has to be prepared for each non-relational database, and of course, there is a problem that a large number of development manhours is required to construct a multi-model database.

SUMMARY

The present invention has been made based on the above-mentioned and other problems, and has an object of providing a data management device and a data management method, in which with respect to a plurality of databases based on different data models, a system that enables a unified data operation for databases based on the other data models by a data operation interface for one of the data models can be efficiently constructed.

According to an aspect of the present invention, a data management device includes an arithmetic device; and a storage device that is connected to the arithmetic device. The data management device is communicably connected to a first database constructed by a first database model and a second database constructed by a second database model different from the first database model. The arithmetic device is configured to convert a structure of the second database to correspond to a structure of the first database, store the database as a conversion table based on first data schema information that is information defining the structure of the first database and second data schema information defining the structure of the second database, determine for which database a query that is received from the outside and described corresponding to the structure of the first database is a query, with reference to the conversion table, converts the query into a query corresponding to the structure of the second database when the query is determined to be a query for the second database, introduce the query into the second database, convert a query result in response to the query into a format corresponding to the structure of the first database, and output the query result.

According to another aspect of the present invention, a data management method is performed by an information processing device that includes an arithmetic device and a storage device connected to the arithmetic device and is communicably connected to a first database constructed by a first database model and a second database constructed by a second database model different from the first database model. The method includes converting a structure of the second database to correspond to a structure of the first database and storing the database as a conversion table based on first data schema information that is information defining the structure of the first database and second data schema information defining the structure of the second database, determining for which database a query that is received from the outside and described corresponding to the structure of the first database is a query, with reference to the conversion table, converting the query into a query corresponding to the structure of the second database when the query is determined to be a query for the second database, introducing the query into the second database, converting a query result in response to the query into a format corresponding to the structure of the first database, and outputting the query result.

According to an aspect of the present invention, there are provided a data management device and a data management method, in which with respect to a plurality of databases based on different data models, a system that enables a unified data operation for databases based on the other data models by a data operation interface for one of the data models can be efficiently constructed. Objects, configurations, and effects other than those described above are clarified by the description of the following examples.

BRIEF DESCRIPTION OF THE DRAWINGS

FIG. 5 is a diagram illustrating a configuration example of an analysis setting table 211;

FIG. 6 is a diagram illustrating a configuration example of an employee master 20-1 that is an example of a relational database;

FIG. 10 is a diagram illustrating a configuration example of a data name and location correspondence intermediate table 204A;

FIG. 11 is a diagram illustrating a configuration example of a data name and location correspondence table 204; and FIG. 12 is a flowchart illustrating a data process flow example of a data operation request process in the data management system according to the present embodiment.

DESCRIPTION OF EMBODIMENTS

Hereinafter, embodiments for carrying out the present invention are described with reference to the drawings. The present embodiment is to exemplify a configuration that enables a data operation for each database by using a data operation system for a relational database with respect to a multi-database including a relational database, a key value database, and a graph database.

<Data Management System 1>

Figure 1:
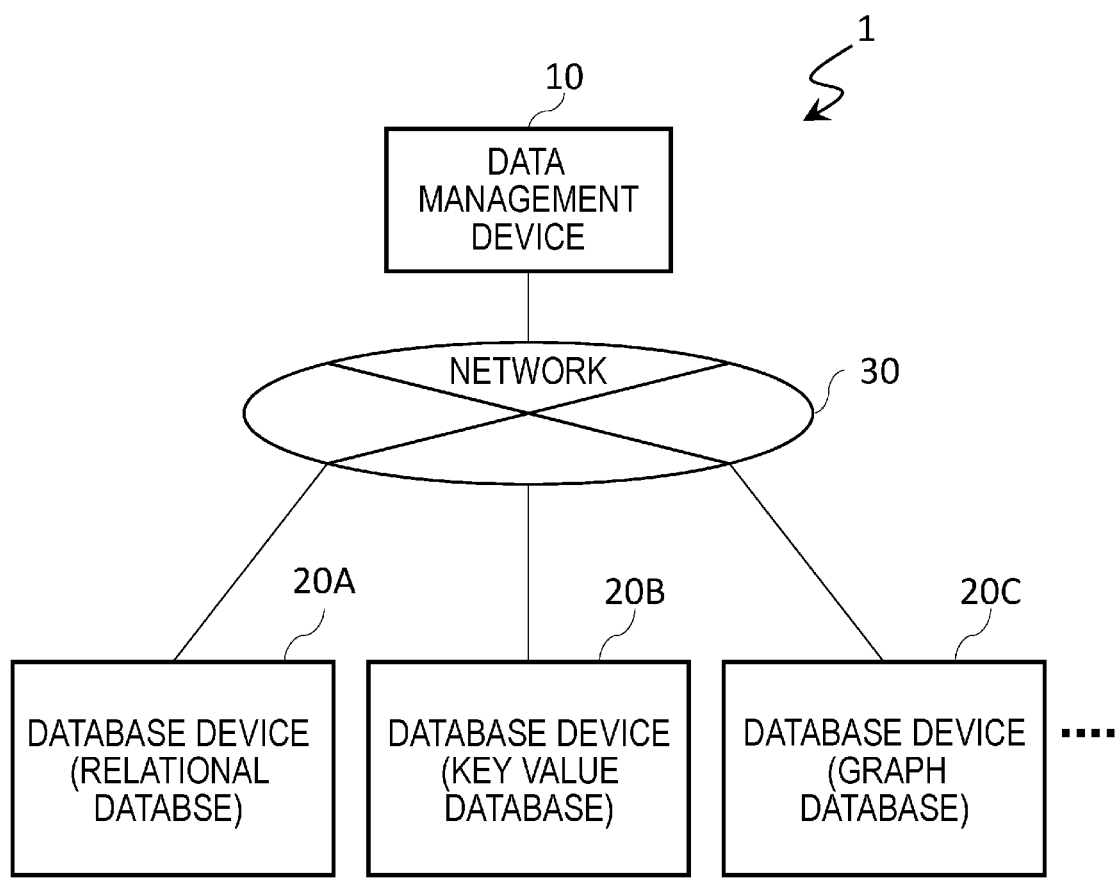
FIG. 1 is a block diagram illustrating a configuration example of a data management system 1 according to an embodiment of the present invention.

First, an entire configuration of a data management system 1 according to the present embodiment is described. FIG. 1 is a block diagram illustrating a configuration example of the data management system 1 according to the present embodiment. The data management system 1 includes a data management device 10, database devices 20A to 20C, and a communication network 30. In addition, hereinafter, when the database devices 20A to 20C are not required to be distinguished from each other, the database devices 20A to 20C may be simply referred to as database devices 20.

The database devices 20A to 20C store databases generated based on different data models, respectively. In the configuration example of FIG. 1, the database device 20A stores a relational database, the database device 20B stores a key value database, and the database device 20C stores a graph database. However, the database model is not limited to the exemplified models. Two or four or more database devices 20 may be provided in the data management system 1. The database devices 20A to 20C may be configured as separate housings as illustrated in the figure, also may share housings as appropriate, and may be distributed on the network or in a so-called cloud configuration.

The data management device 10 includes a configuration of automatically generating a conversion table as a data conversion mechanism so that a data operation request is enabled by a data operation language for a relational database regardless of the difference in data models with respect to the database devices 20A to 20C and a configuration in which a data operation can be requested by the database operation language for relational database with respect to not only the database device 20A but also the database devices 20B and 20C by using the data conversion mechanism. In the example of FIG. 1, the data management device 10 is illustrated to include a housing separate from the database devices 20A to 20C, but may share the housing with some or all of the database devices or may be distributed on the network or in a so-called cloud configuration.

The communication network 30 is a communication line that enables the data management device 10 and the database devices 20A to 20C to communicate with each other, and for example, can be configured with, for example, a communication line such as the Internet, a dedicated line, a WAN, or a LAN. The communication network 30 may be connected to the data management device 10 and the database devices 20A to 20C by wire or wirelessly.

<Data Management Device 10>

Figure 2:
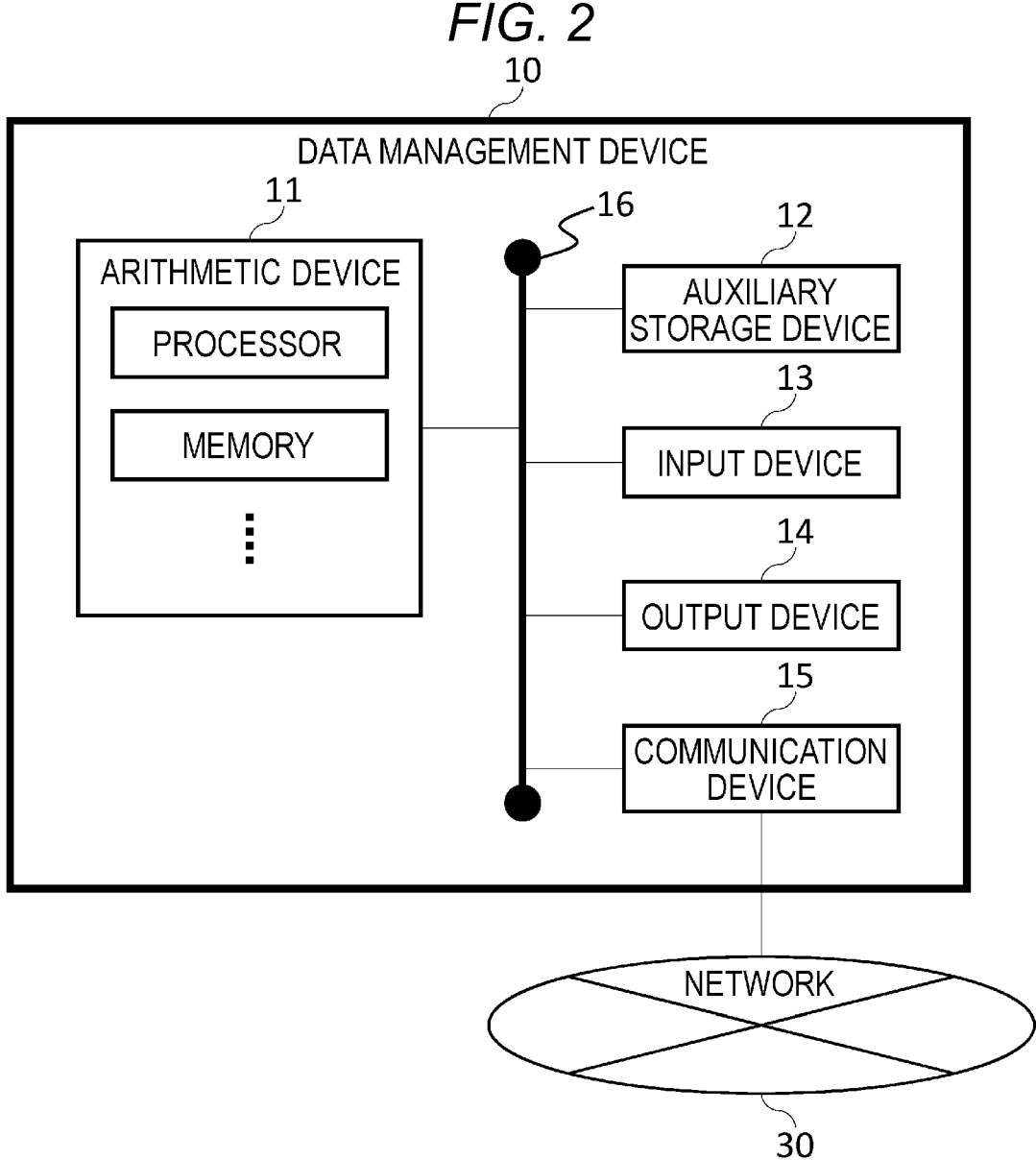
FIG. 2 is a block diagram illustrating a hardware configuration example of a data management device 10 according to the present embodiment.

Subsequently, the data management device 10 is described. In FIG. 2, a hardware configuration example of the data management device 10 according to the present embodiment is described. The data management device 10 has a general computer configuration with a communication function with the communication network 30.

The data management device 10 illustrated in FIG. 2 includes an arithmetic device 11, an auxiliary storage device 12, an input device 13, an output device 14, and a communication device 15. The arithmetic device 11 can be configured with a processor such as an MPU and a CPU and a memory that is a storage device such as a ROM, a RAM, or a flash memory that provides a storage area to be used by the processor. The auxiliary storage device 12 provides a storage area for a program to be executed by the arithmetic device 11 and data or the like to be used by the program, and includes a storage device such as a hard disk drive (HDD), a solid state drive (SSD), an optical drive, or a USB memory. The input device 13 includes an input device capable of inputting data to the data management device 10, such as a keyboard, a mouse, a touch panel, and a voice input device. The output device 14 is an output device capable of outputting data from the data management device 10 and may include a monitor display, a printer, an audio output device, and the like. The communication device 15 can be configured with a communication module such as a network interface card. Each element in the data management device 10 is communicably connected to each other by an internal data communication line 16.

The data management device 10 may be configured as a virtual computer or constructed in a cloud system without being configured as a single housing as illustrated in FIG. 2.

<Database Device 20>

Figure 3:
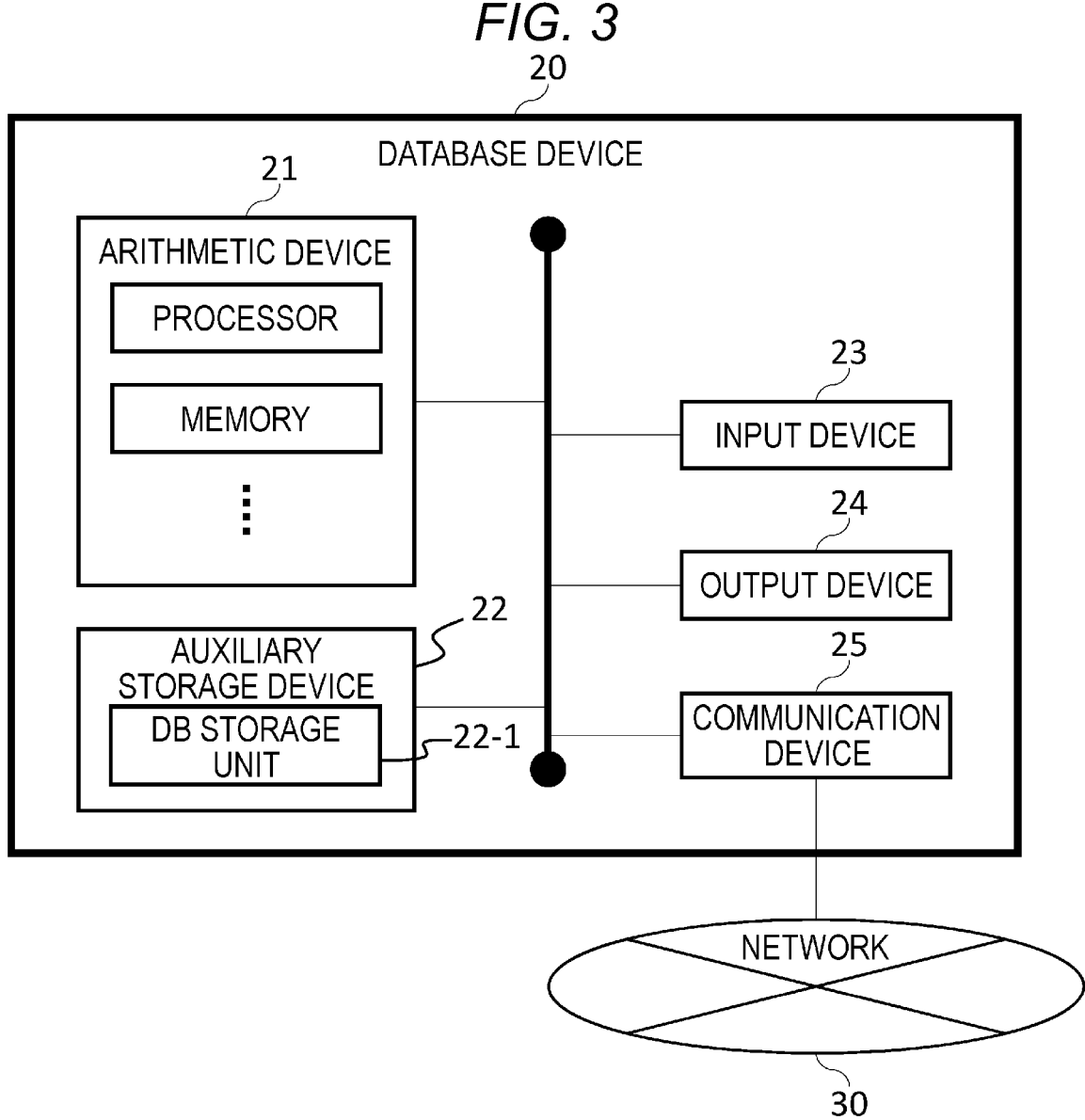
FIG. 3 is a block diagram illustrating a hardware configuration example of a database devices 20 according to the present embodiment.

Subsequently, the database device 20 is described. FIG. 3 illustrates a hardware configuration example of the database device 20 according to the present embodiment. In the same manner as the data management device 10, the database devices 20 have a configuration of a general computer with a communication function with the communication network 30.

The database device 20 illustrated in FIG. 3 includes an arithmetic device 21, an auxiliary storage device 22, an input device 23, an output device 24, and a communication device 25. Each of these elements is substantially the same as each corresponding element in the data management device 10, and the description thereof is omitted.

In the auxiliary storage device 22 of the database device 20, a database storage unit (DB storage unit) 22-1 is stored. As described with reference to FIG. 1, databases in different data formats of a relational database, a key value database, and a graph database are stored in the database storage units 22-1 of the database devices 20A to 20C.

In addition, the databases may be stored in a memory of the arithmetic device 21 to be configured as a so-called on-memory database. The database devices 20A to 20C may be in separate housings as illustrated in FIG. 1 or may be combined in one housing. Otherwise, all or a portion thereof may be stored in the data management device 10. In the same manner as the data management device 10, database devices can be configured as a virtual computer or constructed in a cloud.

Subsequently, a software configuration example of the data management device 10 is described.

<Software Configuration Example of Data Management Device 10>

Figure 4:
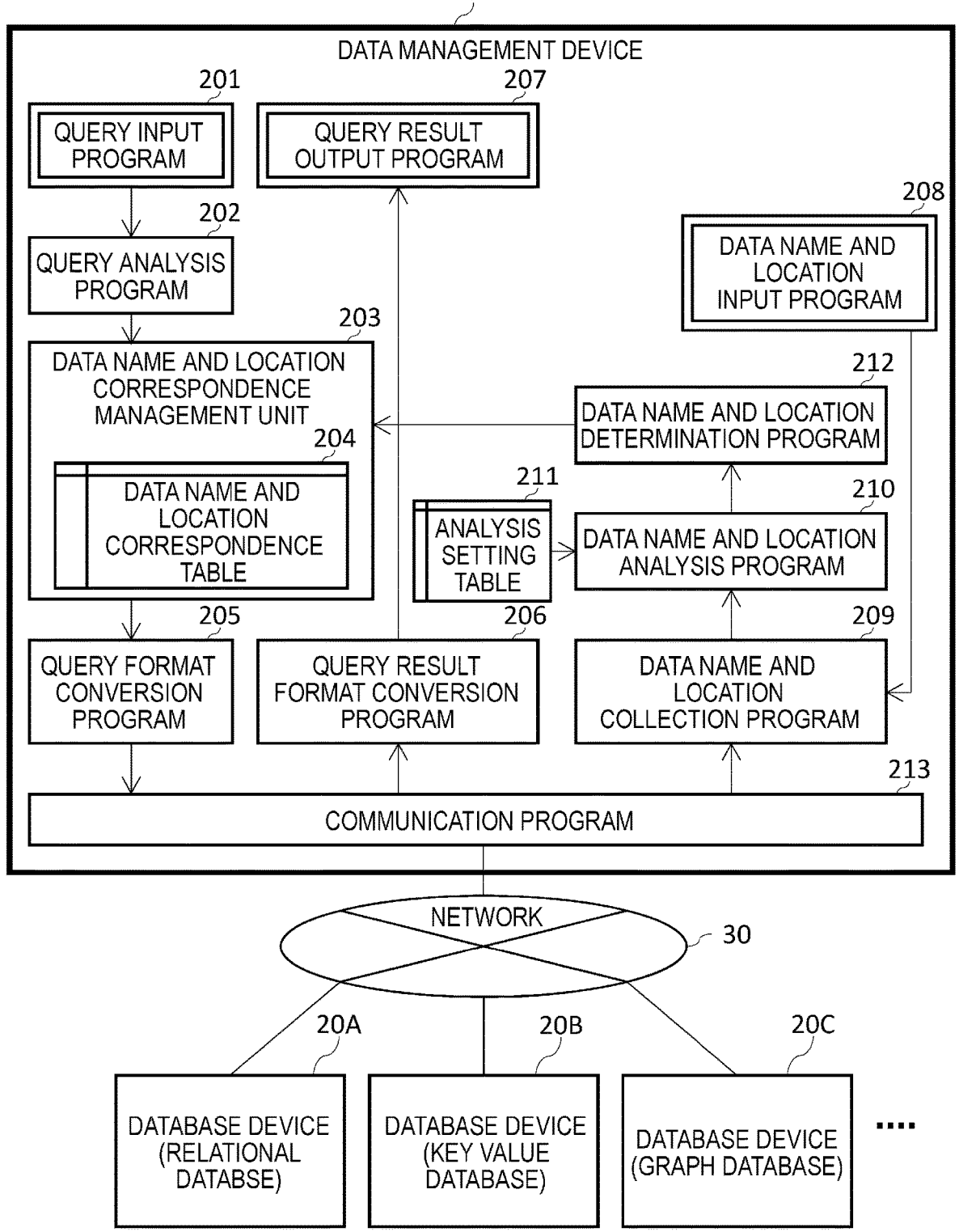
FIG. 4 is a block diagram illustrating a software configuration example of the data management device 10 according to the present embodiment.

FIG. 4 illustrates a configuration example of software installed in the data management device 10 according to the present embodiment. In the data management device 10, software and data for performing, roughly, a query input process of converting an input query into data formats of target databases and giving the converted query to the databases, a query output process of converting and outputting query results returned in response to the query input from the databases as the query targets, and a conversion table generation process of generating a conversion table used for a query conversion process performed in response to the data formats of the databases to be the query targets are installed.

In the query input process, in FIG. 4, a query input program 201, a query analysis program 202, a data name and location correspondence management unit 203, and a query format conversion program 205 convert the query input from the input device 13 or the communication device 15 illustrated in FIG. 2 into the data formats of the databases as the targets to perform a delivering process.

In the query output process, in FIG. 4, a query result format conversion program 206 converts the query results received from the target databases, and a query result output program 207 performs a process of outputting the converted query results to the output device 14.

In the conversion table generation process, data names and locations of the data included in the databases to be the targets of the query from the data management device 10 are collected by a data name and location collection program 209 or input from the input device 13 by a data name and location input program 208. The collected or input data names and location information relating to the locations are subjected to analysis and determination processes by a data name and location analysis program 210 and a data name and location determination program 212 and are stored in the data name and location correspondence management unit 203 as a data name and location correspondence table 204.

An analysis setting table 211 is a data table that stores settings such as data formats thereof in advance, with respect to each database stored in the database devices 20A to 20C. FIG. 5 illustrates a configuration example of the analysis setting table 211. As illustrated in FIG. 5, the analysis setting table 211 according to the present embodiment records, for example, data delimiters, column names, and the like with respect to the relational database stored in the database device 20A. Items and contents recorded in the analysis setting table 211 can be appropriately set in response to the formats of the databases as the targets of the query.

A communication program 213 is a communication control program for controlling transmission and reception processes of data between the query format conversion program 205, the query result format conversion program 206, and the data name and location collection program 209 and the communication network 30. The data process performed by the software installed in the above data management device 10 is described below with reference to a data process flow example.

Subsequently, the databases stored in the database devices 20A to 20C are described.

<Databases Stored in the Database Devices 20A to 20C>

An employee master 20-1 as a relational database, a factory equipment monitor database 20-2 as a key value database, and a process database 20-3 as a graph database are stored in the database devices 20A to 20C, respectively.

FIG. 6 illustrates a configuration example of the employee master 20-1. The employee master 20-1 illustrated in FIG. 6 includes items of employee IDs which are identification codes for uniquely identifying employees, surnames and first names of names of employees associated thereto, employee numbers which are labels of the respective employees, and department IDs which are identification codes indicating departments to which employees specified by the corresponding employee IDs belong.

Figures 7, 8:
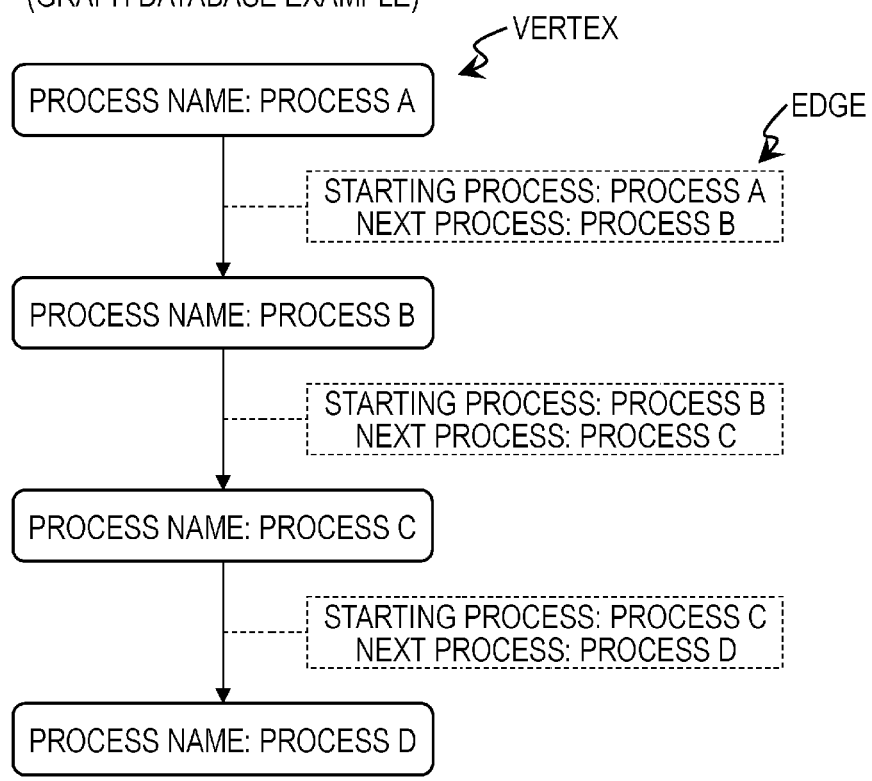
FIG. 7 is a diagram illustrating a configuration example of a factory equipment monitor database 20-2 that is an example of a key value database.
FIG. 8 is a diagram illustrating a configuration example of a process database 20-3 that is an example of a graph database.

FIG. 7 illustrates a configuration example of the factory equipment monitor database 20-2. The factory equipment monitor database 20-2 records physical quantities measured with respect to equipment provided in a specific facility as measurement data.

In the example of FIG. 7, factory names (Example: Factory A), equipment names (Example: Equipment 101), and measurement physical quantities (Example: pressure) are recorded as items of keys with periods (.) as data delimiters. As items of values, values of physical quantities to be measurement targets are recorded. For example, with respect to a key of "Factory A.Equipment 101.pressure", "10" is recorded as a value.

FIG. 8 illustrates a configuration example of the process database 20-3. In the example of FIG. 8, the process database 20-3 as the graph database is configured with vertex elements (Vertex) in which process names are recorded and edge elements (Edge) that connect the vertex elements. In the edge element, items of a starting point process (Example: Process A) and a next process (Example: Process B) are recorded. In the process database 20-3 illustrated in FIG. 8, the plurality of vertexes are connected to each other by the edges so that a flow from Process A to Process D is expressed.

According to the present embodiment, it is assumed that the factory equipment monitor database 20-2 in the key value database format and the process database 20-3 in the graph database format are described in a relational database format, and a conversion table that realizes a function of causing the databases to be seen as one virtual relational database integrated with the employee master 20-1 is automatically generated to be configured so that an access to any one of the databases can be performed by a query for the relational database.

Based on the above configuration, an automatic generation process of the conversion table and a data request operation process using the generated conversion table are described.

<Description of Data Process According to the Present Embodiment>
[Conversion Table Generation Process]

Figure 9:
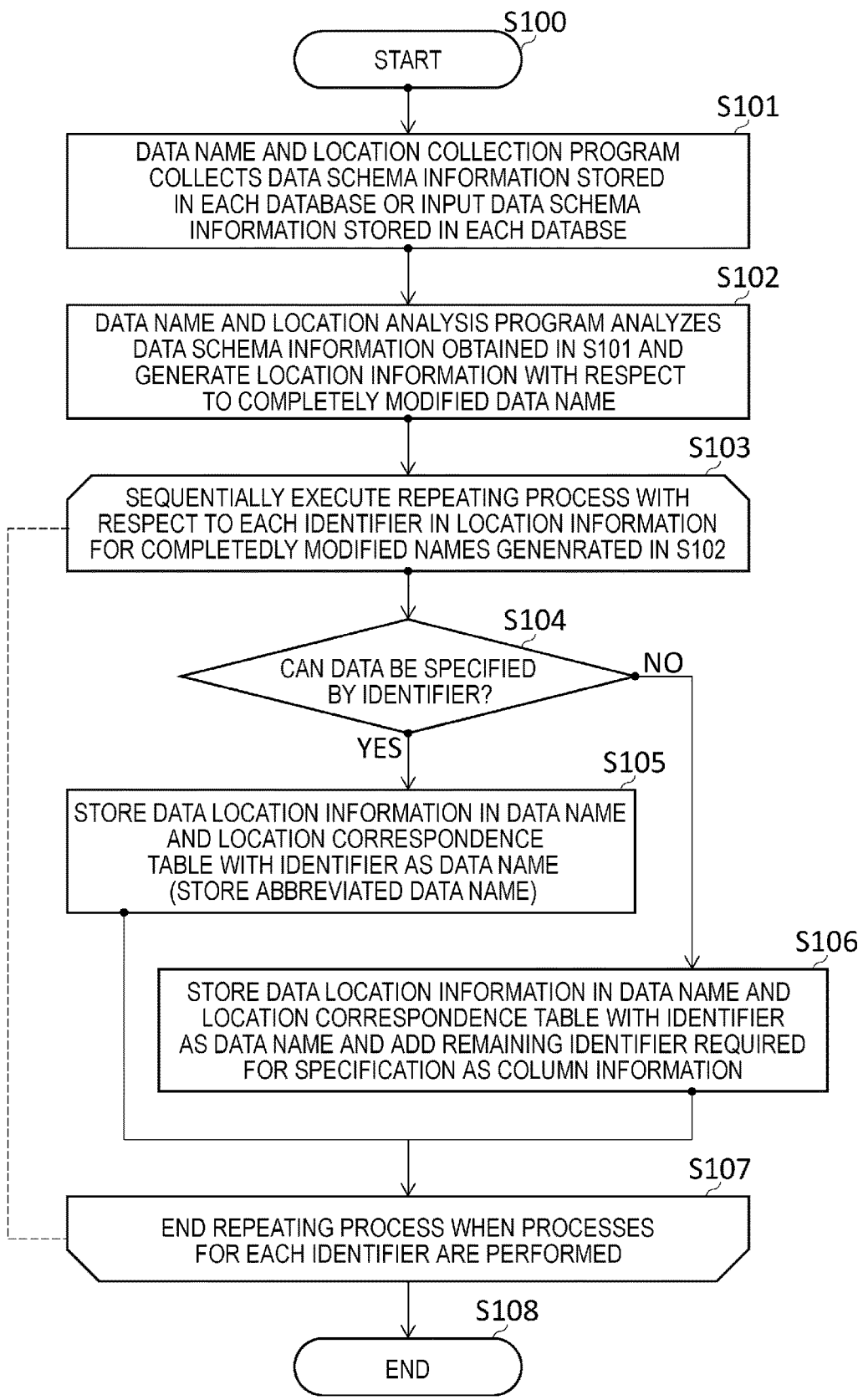
FIG. 9 is a flowchart illustrating a data process flow example of a data name and location correspondence table generation process according to the present embodiment.

First, the conversion table generation process is described. This process corresponds to a process of automatically generating the conversion table described with reference to FIG. 4. FIG. 9 illustrates a data process flow example of the conversion table generation process. This conversion table generation process is a process that is performed in advance before the operation of the data management system 1 according to the present embodiment starts.

In the example of FIG. 9, first, if the data management device 10 starts a data process by an instruction from the input device 13 in S100, the data name and location collection program 209 of the data management device 10 collects data schema information stored in each of the databases 20-1 to 20-3 of the database devices 20A to 20C (S101). This data schema information is information relating to structure of the databases 20-1 to 20-3 and also defines information relating to structure of tables stored in the databases 20-1 to 20-3. The data name and location collection program 209 first generates the analysis setting table 211 based on the collected data schema information of the databases 20-1 to 20-3. Instead of or in addition to the data schema information collection by the data name and location collection program 209, the data schema information of the databases 20-1 to 20-3 may be input via the input device 13 of the data management device 10 and the data name and location input program 208. The analysis setting table 211 may not be automatically generated but may be input in advance.

Subsequently, the data name and location analysis program 210 analyses the data schema information obtained in S101 and generates data table that stores completely modified data names with respect to the databases 20-1 to 20-3 and data location information indicating where data specified by the data names exists (S102). Hereinafter, the data table is referred to as a data name and location correspondence intermediate table 204A. The configuration example of the data name and location correspondence intermediate table 204A is illustrated in FIG. 10.

The data name and location correspondence intermediate table 204A is an intermediate table that is used in a course of generating the data name and location correspondence table 204 that is a conversion table described below and a table that is temporarily stored in a storage area in the memory included in the arithmetic device 11 of the data management device 10 or the like. The data name and location correspondence intermediate table 204A illustrated in FIG. 10 includes items of data names, database models, device names, database names, Identifier 1 to Identifier 3, and column names.

The completely modified names of the corresponding data for specifying the data stored in each database are recorded in the item of the data name. According to the present embodiment, names of the device in which the databases are stored, database names for uniquely identifying the databases, and names of the data stored in the databases are recorded in the items of the data name. This is equivalent to displaying a full path to access in the order of drive-folder-file when the location of certain data is indicated on the computer.

Models of the databases specified in the associated items of the data names are recorded in the items of the database models. In the items of the device names and the database names, the device names and the database names that are in the associated items of the data name are recorded respectively. In Identifiers 1 to 3, data names that are in the associated items of the data names or elements that are equivalent to the data names are recorded. If there are associated items of column names in the database, the contents thereof are recorded in the items of column names, and if there are no items corresponding to the column names, the items of column names remain blank.

As illustrated in FIG. 10, if the database to be analyzed is the employee master 20-1 as the relational database, a list of a device name, a database name, and data name is checked based on the data schema information, device name=Device A, database name=DB_1, and Identifier 1=employee master are recorded, and the employee ID, the surname, the first name, the employee number, and the department ID are recorded in the column name.

If the database to be analyzed is the factory equipment monitor database 20-2 as the key value database, a list of a device name, a database name, and key names separated by set delimiters (for example, periods) is checked based on the same data schema information, device name=Device B and database name=DB_2 are recorded, and Factory A, Equipment 101, and the pressure which are items of keys are recorded as the items of Identifiers 1 to 3.

If the database to be analyzed is the process database 20-3 as the graph database, a list of a device name, a database name, a classification of Vertex and Edge, and data names separated by set delimiters (for example, slashes) is checked. Also, for example, device name=Device C, database name=DB_3, Identifier 1=Vertex, and Identifier 2=process are recorded, and a process name and a process relationship are recorded in the column name.

Next, the data name and location analysis program 210 performs repetitive processes of S104 to S107 in the order of identifiers in the location information with respect to the completely modified data name generated in S102. First, the data name and location analysis program 210 and the data name and location determination program 212 determine whether data can be specified by the identifier obtained from the first record of the data name and location correspondence intermediate table 204A (S104). If it is determined that the data can be specified (Yes in S104), the data name and location determination program 212 stores the data location information in the data name and location correspondence table 204 with Identifier 1 thereof as the data name (S105). At this point, the stored data name is not the completely modified name, but an abbreviated name, for example, an employee master or a process.

FIG. 11 illustrates a configuration example of the data name and location correspondence table 204. In the example of FIG. 11, in case of the employee master 20-1, the data, the employee ID, the surname, the first name, the employee number, and the department ID of the item of the column name can be specified by the employee master recorded in the item of Identifier 1. In addition, in case of the process database 20-3, if the vertex and the process are recorded in the items of Identifiers 1 and 2, respectively, the process name and the process relationship in the item of the column name are specified as the data.

Meanwhile, if it is determined that the data cannot be specified by the identifier obtained from the data name of the data name and location correspondence intermediate table 204A (No in S104), the data name and location determination program 212 adds a remaining identifier to the item of the column name (S106). For example, in the example of FIG. 11, when Identifier 1 is "Factory A", the location of the data cannot be specified by Identifier 1, and thus for example, "Remaining Identifier 1 (=equipment), Remaining Identifier 2 (=physical quantity), time, and a value" are recorded in the corresponding item of the column name. When Identifier 2 is "Equipment 101", the location of the data cannot be specified even by Identifier 2, and thus for example, "Remaining Identifier 1 (=physical quantity), time, and a value" are recorded in the corresponding item of the column name.

Here, the data name and location determination program 212 determines whether the processes of S104 to S106 with respect to all identifiers are performed, and when it is determined that the processes with respect to all identifiers are not performed, the data name and location determination program 212 returns to the determination step of S104. When it is determined that the processes of S104 to S106 with respect to all identifiers are completed, the data name and location analysis program 210 and the data name and location determination program 212 complete the repetitive process and end the conversion table generation process (S107 and S108).

According to the above conversion table generation process, in addition to the relational database model, with respect to the databases constructed by the key value database model and the graph database model, a conversion table is automatically generated, and the databases also can be treated as databases relating to the table and the columns of the relational database model. Therefore, the access from a user and an application can be easily performed by an operation in the relational database.

[Data Operation Request Process]

Next, a data operation request process according to the present embodiment is described. The data operation request process according to the present embodiment is equivalent to the query input process and the query output process in the description relating to the data management device 10 of FIG. 4 and is a process of inputting the query introduced to the data management device 10 to the target databases 20-1 to 20-3 via a required conversion process by using the generated data name and location correspondence table 204, and obtaining, converting, and outputting a query result. FIG. 12 illustrates a data process flow example of a data operation request process performed by the data management device 10 according to the present embodiment.

First, if the data management device 10 starts a data process by an instruction or the like from the input device 13 in S200, the query input program 201 of the data management device 10 receives a query via the input device 13 or the communication device 15 (S201). Next, the query analysis program 202 analyses the query received in S201 (S202). Specifically, the query analysis program 202 extracts a portion indicating the data name in the target query. According to the present embodiment, the input query is described in a format for the relational database as a target, and the query analysis program 202 extracts a data name from the query in this premise.

Next, the query analysis program 202 refers to the data name and location correspondence table 204 by the data name extracted in S202 and specifies the location of the data to which is targeted by the received query (S203). For example, if the query includes an "employee master" as the data name, the query analysis program 202 refers to the data name and location correspondence table 204 and obtains information that the data is stored in Database DB_1 of Device A (the database device 20A). In contrast, for example, if the query includes "Equipment 101" as the data name, the query analysis program 202 refers to the data name and location correspondence table 204 and obtains the information that the data is stored in Database DB_2 of Device B (the database device 20B).

Next, the query format conversion program converts the query format into the formats corresponding to the databases 20A to 20C from the query analysis result of S203 and transmits the query to the databases 20A to 20C (S204). According to the present embodiment, if it is determined that the employee master that is Database DB_1 stored in Device A (the database device 20A) is the destination of the query, the query for the relational database as the target is not converted and transmitted to the database device 20A without change. If it is determined that the factory equipment monitor database that is Database DB_2 stored in Device B (the database device 20B) is the destination of the query, the format of the query is converted into the format for the key value database, and the query is transmitted to the database device 20B. In the same manner, if it is determined that the process database is the destination of the query, the format of the query is converted into the format for the graph database, and then the query is transmitted to the database device 20C. In addition to the above formats, even when a database that is not the relational database is included, the query format can be converted in the same manner.

If the query is input to the target database, and the query result corresponding thereto is returned from the target database, the query result format conversion program 206 converts the query result into the original relational database format (S205). The query result format conversion program 206 can convert the format of the transmission source database into the relational database format if necessary, in response to from which of the database devices 20A to 20C, the query result is returned.

Finally, the query result output program 207 outputs the query result received from the query result format conversion program 206 to the output device 14 of the data management device 10 and ends the process (S206 and S207).

According to the above data operation request process, by using the query set for the database in the relational database format, a data operation request such as data search is performed on a database in another format such as a key value database and a graph database, and the result of the query can be received in a relational database format. Therefore, a complicated preprocess for preparing queries in different formats in response to the format of the target database is not required, and the efficiency of the data operation request process can be improved.

The arithmetic device can store a completely modified data name with respect to data stored in the first database and the second database from the first data schema information and the second data schema information, together with data location information indicating a location of data corresponding to the data name which is associated with each data name, in the storage device. According to this, information for generating a conversion table for specifying in which database, data is stored can be obtained.

The arithmetic device determines whether data location information can be specified by each element included in the completely modified data name. If it is determined that the data location information can be specified by an element, the element is used as a data name, and data location information associated with the data name is stored as the conversion table. If it is determined that the data location information cannot be specified by an element, the element is used as a new data name, and a remaining element required for specifying data location information is added in association with the data name. In this case, data location information can be obtained for each element included in a data name.

Further, the arithmetic device extracts a data name indicating data to be a target of the query from the received query, refers to the conversion table for data location information associated with the data name, and specifies a database model of the database in which data corresponding to the data name is stored, converts a format of the query to a format corresponding to a different database model if it is determined that the database model is different from a database model of the database in which data to be a target of the query is stored, introduces the query to a target database, converts a format of an obtained query result into an original query format, and outputs the query result. In this case, without performing a preprocess specific to a format of a query, an inquiry about a database can be performed.

When the first database is a relational database, and the second database is a key value database or a graph database, in the conversion table, when the second database is the key value database, the arithmetic device stores items of values thereof in items of columns in the first database, and when the second database is the graph database, the arithmetic device stores data specified by a device name, a database name, a vertex element, and an edge element thereof in items of columns in the first database. In this case, by using a query in a format for a relational database, a key value database and a graph database also can be operated.

In addition, the present invention is not limited to the above examples, but includes various modifications. For example, the above examples are described specifically for better understanding of the present invention, and is not limited to include all configurations in the description.

Further, the above configurations, functions, processing units, processing means, and the like may be realized by hardware by designing a portion or all of the same by, for example, an integrated circuit. Further, each of the above configurations, functions, and the like may be realized by software by the processor interpreting and executing a program that realizes each function. Information such as programs, tables, and files that realize each function can be stored in a storage device such as a non-volatile semiconductor memory, a hard disk drive, and a solid state drive (SSD), or a non-transitory computer-readable data storage medium such as an IC card, an SD card, and a DVD.

In addition, control lines and information lines indicate what is considered necessary for explanation, and not all control lines and information lines on the product are necessarily shown. In practice, it may be considered that almost all configurations are connected to each other.

What is claimed is:

1. A data management device comprising:
   and
   a storage device that stores a location correspondence table;
   a communication interface that is communicatively coupled to a first database having a first database model and a second database having a second database model that is different from the first database model; and
   a processor that is communicatively coupled to the storage device and the communication interface, wherein the processor is configured to:
   receive, using the communication interface, an input query,
   extract a plurality of data names from the input query,
   search for respective locations for each of the plurality of data names using the location correspondence table, wherein the search includes adding a new data name to the location correspondence table when a particular data name among the plurality of data names is not found,
   determine a database model for the input query,
   determine for each of the respective locations, whether a particular location corresponds to the first database or the second database,
   for each particular location that corresponds to the first database, transmit a first query based on the input query to the first database, wherein the first query is created based on a conversion of the input query when the database model for the input query is different than the first database model,
   receive first query results in response to the first query from the first database,
   for each particular location that corresponds to the second database, transmit a second query based on the input query to the first database, wherein the second query is created based on a conversion of the input query when the database model for the input query is different than the second database model,
   receive second query results in response to the first query from the first database,
   form combined query results according the database model for the input query based on the first query results and the second query results, and
   output the combined query results.

2. The data management device according to claim 1, wherein the adding the new data name includes determining location information for the new data name.

3. The data management device according to claim 1, wherein:
   the combined query results are formed by converting the first query results to the database model for the input query when the database model for the input query is different than the first database model, and
   the combined query results are formed by converting the second query results to the database model for the input query when the database model for the input query is different than the second database model.

4. The data management device according to claim 1, wherein the first database is a relational database, and the second database is a key value database or a graph database, and
   wherein, in the location correspondence table, when the second database is the key value database, the storage device stores items of values thereof in items of columns in the first database, and when the second database is the graph database, the storage device stores data specified by a device name, a database name, a vertex element, and an edge element thereof in items of columns in the first database.

5. A data management method, the method comprising:

storing a location correspondence table in a memory; wherein the location correspondence table identifies a location information that corresponds to location of a data name within either a first database having a first database model or a second database having a second database model that is different from the first database model;

receiving an input query;

extracting a plurality of data names from the input query;

searching for respective locations for each of the plurality of data names using the location correspondence table, wherein the search includes adding a new data name to the location correspondence table when a particular data name among the plurality of data names is not found;

determining a database model for the input query;

determining for each of the respective locations, whether a particular location corresponds to the first database or the second database;

for each particular location that corresponds to the first database, transmitting a first query based on the input query to the first database, wherein the first query is created based on a conversion of the input query when the database model for the input query is different than the first database model;

receiving first query results in response to the first query from the first database;

for each particular location that corresponds to the second database, transmitting a second query based on the input query to the first database, wherein the second query is created based on a conversion of the input query when the database model for the input query is different than the second database model;

receiving second query results in response to the first query from the first database;

forming combined query results according the database model for the input query based on the first query results and the second query results;

outputting the combined query results.

6. The data management method according to claim 5, wherein the adding the new data name includes determining location information for the new data name.

7. The data management method according to claim 5, wherein:

the combined query results are formed by converting the first query results to the database model for the input query when the database model for the input query is different than the first database model, and the combined query results are formed by converting the second query results to the database model for the input query when the database model for the input query is different than the second database model.

8. The data management method according to claim 5, wherein the first database is a relational database, and the second database is a key value database or a graph database, and wherein, in the location correspondence table, when the second database is the key value database, the memory stores items of values thereof in items of columns in the first database, and when the second database is the graph database, the memory stores data specified by a device name, a database name, a vertex element, and an edge element thereof in items of columns in the first database.

* * * * *